US012571951B2

(12) United States Patent
Gather et al.

(10) Patent No.: US 12,571,951 B2
(45) Date of Patent: Mar. 10, 2026

(54) INTERFERENCE FILTER AND USE OF A STACKED ARRANGEMENT OF LAYER STRUCTURES AS INTERFERENCE FILTER

(71) Applicant: Universität zu Köln, Cologne (DE)

(72) Inventors: Malte C. Gather, St. Andrews (GB); Andreas Mischok, St. Andrews (GB)

(73) Assignee: Universität zu Köln, Cologne (DE)

( * ) Notice: Subject to any disclaimer, the term of this patent is extended or adjusted under 35 U.S.C. 154(b) by 384 days.

(21) Appl. No.: 18/247,341

(22) PCT Filed: Sep. 23, 2021

(86) PCT No.: PCT/EP2021/076247
§ 371 (c)(1),
(2) Date: Mar. 30, 2023

(87) PCT Pub. No.: WO2022/069345
PCT Pub. Date: Apr. 7, 2022

(65) Prior Publication Data
US 2023/0393316 A1     Dec. 7, 2023

(30) Foreign Application Priority Data
Sep. 30, 2020    (DE) .......................... 102020125597.7

(51) Int. Cl.
G02B 5/28        (2006.01)
(52) U.S. Cl.
CPC .................................... G02B 5/284 (2013.01)
(58) Field of Classification Search
CPC ...................................................... G02B 5/284
(Continued)

(56) References Cited

U.S. PATENT DOCUMENTS

2021/0124122 A1*  4/2021  Simpkins .............. G02F 1/3523
2021/0376568 A1*  12/2021  Cheng ................... H01S 5/0014

FOREIGN PATENT DOCUMENTS

CN        108445570 A      8/2018
EP           2260337 A1    12/2010

OTHER PUBLICATIONS

Chen Jun-Rong et al., "Large vacuum Rabi splitting in ZnO-based hybrid microcavities observed at room temperature", Applied Physics Letters, American Institute of Physics, vol. 94, Melville, New York, Feb. 9, 2009, 3 pages.

(Continued)

*Primary Examiner* — Mahidere S Sahle
(74) *Attorney, Agent, or Firm* — Dority & Manning, P.A.

(57) ABSTRACT

An interference filter for the wavelength-selective filtering of light includes a stack arrangement of layer structures which has two partially permeable mirror layer structures and an intermediate layer structure arranged between the two partially permeable mirror layer structures, wherein the two partially permeable mirror layer structures form an optical resonator with a characteristic resonator wavelength $k\beta$. The material of the intermediate layer structure has, at an absorption wavelength, such an excitonic material resonance that the wavelength-dependent transmittance of the stack arrangement is determined in a wavelength range surrounding the absorption wavelength range by a strong coupling of the photons, located in the resonator, of the light with excitons of said material resonance.

8 Claims, 5 Drawing Sheets

(58) Field of Classification Search
USPC .......................... 359/260, 261, 263, 580–590
See application file for complete search history.

(56) References Cited

OTHER PUBLICATIONS

International Search Report (with English translation) for PCT/EP2021/076247, mailed on Dec. 13, 2021, 3 pages.
Takada Noriyuki et al, "Polariton emission from polysilane-based organic microcavities", Applied Physics Letters, American Institute Of Physics, vol. 82, No. 12, Melville, New York, Mar. 24, 2003, 3 pages.
Thomas Ebbesen, "Hybrid Light-Matter States in a Molecular and Material Science Perspective", Accounts of Chemical Research, American Chemical Society, 2016, 10 pages.

* cited by examiner

INTERFERENCE FILTER AND USE OF A STACKED ARRANGEMENT OF LAYER STRUCTURES AS INTERFERENCE FILTER

CROSS-REFERENCE TO RELATED APPLICATIONS

The present application is a national phase application of International Patent Application No. PCT/EP2021/076247, filed Sep. 23, 2021, which, in turn, is based upon and claims the right of priority to German Patent Application Number 10 2020 125 597.7, filed Sep. 30, 2020, the disclosures of both of which are hereby incorporated by reference herein in their entirety for all purposes.

The invention relates to an interference filter for wavelength-selective filtering of light, having a stack arrangement of layer structures comprising two partially permeable mirror layer structures and an intermediate layer structure arranged between the two partially permeable mirror layer structures, wherein the two partially permeable mirror layer structures form an optical resonator with a characteristic resonator wavelength $\lambda_R$.

The invention further relates to the use of a stack arrangement of layer structures as an interference filter, wherein the stack arrangement of layer structures comprises two partially permeable mirror layer structures and an intermediate layer structure arranged between the two partially permeable mirror layer structures, wherein the two partially permeable mirror layer structures form an optical resonator with a characteristic resonator wavelength $\lambda_R$.

Here, the individual layer structure of such a stack arrangement can be formed of a monolayer or a single-layer layer structure or a multilayer layer structure. In addition to the arrangement forming the resonator formed of first mirror layer structure—intermediate layer structure—second mirror layer structure, the stack arrangement can also comprise further layer structures.

The term "light" in the context of the invention is not intended to be strictly limited to the visible spectral range (VIS), but rather—as is quite common in linguistic usage (e.g., with terms such as IR light, UV light)—extend to the adjacent spectral ranges such as infrared (IR), ultraviolet (UV) and terahertz (THz).

A simple example of an interference filter of the type mentioned above is a dielectric bandpass filter based on the transmission of light through a Fabry-Perot type optical cavity, wherein two mirror layer structures enclose a dielectric intermediate layer structure of precisely controlled thickness d therebetween. The transmission wavelength is then determined by the constructive interference in the intermediate layer structure and a defined transmission band is obtained when the thickness d is an integer multiple i of about half of a desired resonator wavelength $\lambda_R$:

$$d \approx i * \frac{\lambda_R}{2n} \tag{1}$$

wherein n is the refractive index of the dielectric intermediate layer structure in the cavity. Such an interference filter, like all conventional interference-based filters, inherently exhibits a strong angular dispersion, i.e. a blue shift of the transmitted wavelength when the filter is tilted by an angle θ. For a Fabry-Perot type cavity, the dispersion can be approximated as $$\lambda = \lambda_0 * \sqrt{1 - \left(\frac{\sin\theta}{n}\right)^2} \tag{2}$$

wherein $\lambda_0$ is the transmitted wavelength at θ=0° angle of incidence. This effect can be used for tuning the desired transmission wavelength, but in practice this behavior is often undesirable for several reasons. The presence of angular dispersion requires precise alignment of the filter and makes optical systems using such filters susceptible to temporal drift. Furthermore, if the light passing through the filter has a distribution of angular components (as is the case with most light sources), the wavelength selectivity of the filter is compromised, and instead of producing a narrow spectral line, the transmitted light is spectrally broadened in an uncontrolled manner. The transmitted line shape is often distorted considerably at large angles, i.e. it widens considerably and, depending on the polarization of the incident light, can exhibit a different behavior (polarization splitting).

Document EP 2 260 337 A1 describes such an interference filter for wavelength-selective filtering of light, comprising a stack arrangement of dielectric and metallic layer structures, which include, among others, two partially permeable mirror layer structures and a dielectric intermediate layer structure arranged between the two partially permeable mirror layer structures, wherein the two partially permeable mirror layer structures form an optical resonator with a characteristic resonator wavelength $\lambda_R$. In particular, the mirror layer structures are formed by silver layers, and the dielectric intermediate layer structure is formed by single- or multilayer oxide layers. Furthermore, the interference filter has a transparent substrate on which the layer stack is arranged.

Document CN 108 445 570 A describes a wavelength selector based on a strong coupling of surface plasmons with an optical resonator.

It is the object of the invention to provide measures to provide an interference filter with well-defined filter behavior, in which preferably also the aforementioned angular dispersion problem is reduced.

According to the invention, the object is achieved by the features of the independent claims. Advantageous embodiments of the invention are provided in the subclaims.

In the interference filter according to the invention for wavelength-selective filtering of light, comprising a stack arrangement of layer structures comprising two partially permeable mirror layer structures and an intermediate layer structure arranged between the two partially permeable mirror layer structures, wherein the two partially permeable mirror layer structures form an optical resonator with a characteristic resonator wavelength $\lambda_R$, it is provided that the material of the intermediate layer structure exhibits such an excitonic material resonance at an absorption wavelength $\lambda_A$ that the wavelength-dependent transmittance $T(\lambda)$ of the stack arrangement in a wavelength range surrounding the absorption wavelength $\lambda_A$ is determined by a strong coupling of photons of the light located in the resonator with excitons of this material resonance. This strong coupling of photons of light with the material resonance results in a quasiparticle known in physics as a polariton. Therefore, this interference filter could also be called an "optical polariton filter". Such an "optical polariton filter" can provide relatively sharp-edged energy-selective filtering, which is advantageous for a large number of applications.

An arrangement quite similar to the stack arrangement of layer structures, comprising a resonator comprising two parallel aligned mirrors and a material disposed within the resonator which has such a material resonance at an absorption wavelength $\lambda_A$ that the wavelength-dependent transmittance $T(\lambda)$ of the stacked arrangement in a wavelength range surrounding the absorption wavelength $\lambda_A$ is determined by a strong coupling of the photons of light located in the cavity with this material resonance, is known from the article "Thomas W. Ebbesen:" Hybrid Light-Matter States in a Molecular and Material Science Perspective" Acc. Chem. Res. 2016, 49, 2403-2412" (Ebbesen article for short). Although transmission properties of the arrangement are described in the article, the possibility of a use of this arrangement as an interference filter is neither mentioned nor implied in any way in the article.

According to a preferred embodiment of the invention, the resonator wavelength $\lambda_R$ at perpendicular incidence of light is at most as large as the absorption wavelength $\lambda_A$. Thus, $\lambda_R \leq \lambda_A$ applies. Such a matching of the resonator wavelength $\lambda_R$ with the absorption wavelength $\lambda_A$ is not described in the Ebbesen article.

According to a further preferred embodiment of the invention, the resonator wavelength $\lambda_R$ is selected with respect to the absorption wavelength $\lambda_A$ in such a way that two transmission modes energetically spaced from each other with corresponding band structures result.

In particular, it is provided that, corresponding to the course of the band structures for at least one of these transmission modes as a function of the angle of incidence $\theta$ relative to the perpendicular angle of incidence $\theta=0°$, a change in the transmission wavelength towards lower wavelengths occurs, wherein the change in the transmission wavelength relative to the value at perpendicular angle of incidence $\theta=0°$ is less than 2% at an angle of incidence $\theta=45°$ and less than 5% at an angle of incidence $\theta=80°$. In other words, the course of the band structures is much less curved, i.e. much flatter, compared to that of an interference filter designed as a dielectric filter. Accordingly, the angular dispersion that occurs is much smaller. Thus, for all applications where such an angular dispersion is undesirable, an appropriately designed "optical polariton filter" has clear advantages.

With respect to the two energetically spaced transmission modes with the corresponding band structures, it is also preferably provided that the strong coupling of the photons of the light located in the resonator with the material resonance results in an energetic splitting called Rabi splitting, the magnitude $\Delta E$ of which exceeds the smaller value of the two values mentioned below:

(a) 5% of the energy of the coupling material resonance $E_M$ or (b) the fixed limit value $E_G=100$ meV.

With regard to the transmission modes, it is preferably provided that at least one of these transmission modes has a quality factor $Q=E_T/\Delta_E \approx \lambda_T/\Delta\lambda > 8$. A quality factor Q greater than 8 has been found to be advantageous in practice.

According to a further preferred embodiment of the invention, each of the two partially permeable mirror layer structures has a reflectivity of at least 20% at a relevant wavelength range $\Delta\lambda_{rel}$ comprising the resonator wavelength $\lambda_R$, the absorption wavelength $\lambda_A$ and a transmission wavelength $\lambda_T$ of the filter. A resonator with such partially permeable mirror layer structures is highly effective.

According to yet another preferred embodiment of the invention, the interference filter or its stack arrangement has a transmittance $T(\lambda)$ of at least 0.05 at least one of the transmission wavelengths $\lambda_T$ at perpendicular incidence of light.

According to a preferred embodiment of the invention, the absorption of the material of the intermediate layer structure at a relevant coupling wavelength corresponding to the excitation wavelength $\lambda_A$ is at least 10%.

According to yet another preferred embodiment of the invention, the material of the intermediate layer structure is an organic material. Organic materials are very useful for the intermediate layer structure because they exhibit a tunable and strong excitonic absorption, are easy and inexpensive to process, and also exhibit mechanical flexibility.

Furthermore, it is advantageously provided that the interference filter is an interference filter for filtering light from at least one of the following spectral ranges:

UV range (about 200-380 nm),

VIS range (about 380-780 nm),

NIR range (about 780-3 μm),

IR range (about 3 μm-1 mm), and

THz range (about 30 μm-3 mm).

In the use of a stack arrangement of layer structures as an interference filter according to the invention, wherein the stacked arrangement of layered structures comprises two partially permeable mirror layer structures and an intermediate layer structure arranged between the two partially permeable mirror layer structures, wherein the two partially permeable mirror layer structures form an optical resonator having a characteristic resonator wavelength $\lambda_R$, it is provided that the material of the intermediate layer structure has such an excitonic material resonance at an absorption wavelength $\lambda_A$ that the wavelength-dependent transmittance $T(\lambda)$ of the stack arrangement in a wavelength range surrounding the absorption wavelength $\lambda_A$ is determined by a strong coupling of the photons located in the resonator of the light with excitons of this material resonance.

As already mentioned in connection with the interference filter according to the invention, a quite similar arrangement with a resonator comprising two parallel aligned mirrors and a material located in the resonator, which comprises a corresponding material resonance for a strong coupling of the photons of the light located in the cavity with this material resonance is known from the Ebbesen article. Although transmission properties of the arrangement are described in the article, the possibility of using this arrangement as an interference filter is neither mentioned nor implied in any way in the article.

The embodiments of the stack arrangement mentioned in connection with the advantageous embodiments of the interference filter according to the invention are accordingly also advantageous in connection with the use of such a stack arrangement as an interference filter 5.

In the following, the invention will be explained by way of example with reference to the accompanying drawings on the basis of preferred exemplary embodiments, wherein the features shown below can represent an aspect of the invention both indi-vidually and in any combination.

Figure 1:
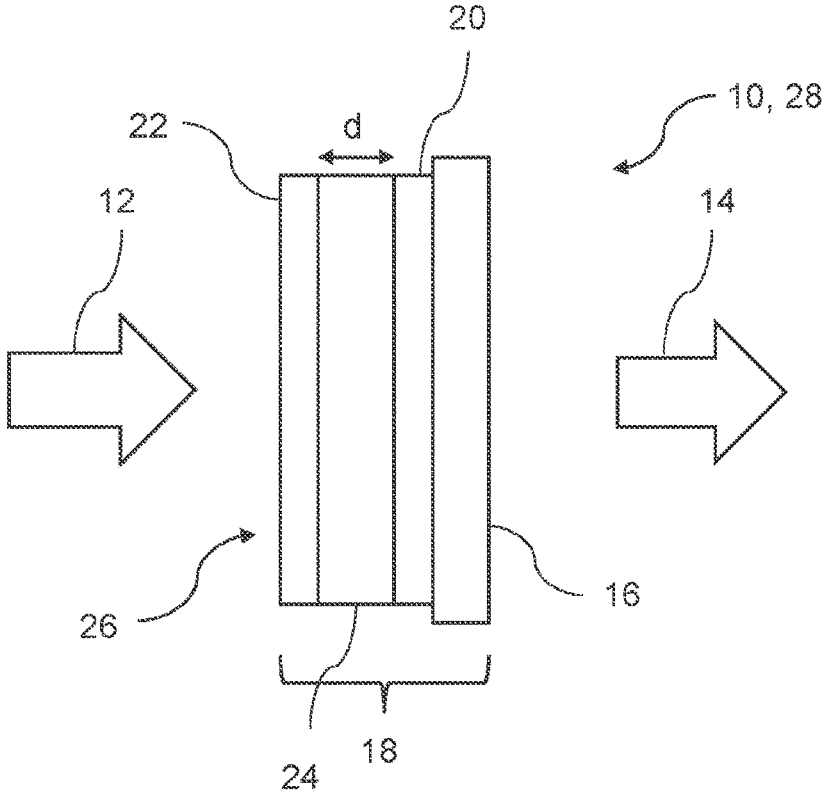
FIG. 1 shows an interference filter for wavelength-selective filtering of light according to a first preferred embodiment of the invention.

FIG. 1 shows a schematic view of an interference filter 10 for wavelength-selective filtering of light together with incident light (arrow 12) and transmitted, energy-selectively filtered light (arrow 14).

The interference filter 10 comprises a transparent substrate 16 and a stack arrangement 18 of (here in the example of FIG. 1 three) layer structures 20, 22, 24. Here, the layer structures 20, 22, 24 comprise two partially permeable mirror layer structures 20, 22 and an intermediate layer structure 24 arranged between the two partially permeable mirror layer structures 20, 22 made of a material that exhibits a material resonance at an absorption wavelength $\lambda_A$. The two partially permeable mirror layer structures 20, 22 have a well-defined spacing d and form an optical resonator 26 with a characteristic resonator wavelength $\lambda_R$. In this case, the material of the intermediate layer structure 24 exhibits such a material resonance at the absorption wavelength $\lambda_A$ that the wavelength-dependent transmittance $T(\lambda)$ of the stacking arrangement 18 is determined in a wavelength surrounding the absorption wavelength by a strong coupling of the photons of the light located in the resonator 26 with this material resonance. Such an interference filter 10 could also be referred to as a polariton filter 28. In physics, a polariton is understood to be the quasiparticle of the strong coupling or strong interaction of photons with such a material resonance.

In the implementation shown in FIG. 1, the interference filter 10 formed of a polariton filter 28 consists of two metallic mirror layer structures 20, 22 (such as thin metal films, dielectric mirrors, subwavelength gratings, . . . ), between which a strong coupling layer with a strong material resonance is located as an intermediate layer structure 24. Other types of cavities serving as resonators 26 with well-controlled resonances, e.g., using distributed feedback, photonic crystals, whispering gallery modes or others, can also be applied. For the intermediate layer acting as a strong coupling layer, organic materials are very useful because they exhibit a tunable and strong excitonic absorption, are easy and inexpensive to process, and also exhibit mechanical flexibility. Other possible materials include, inter alia, II-VI semiconductors and III-V semiconductors such as ZnS and GaAs, hybrid organic-inorganic or purely inorganic perovskites, 2D materials such as graphene, 2D transition metal dichalcogenides, or other nanomaterials such as for example, carbon nanotubes or quantum dots.

In the following, the operating principle of the interference filter 10 formed of a polariton filter 28 by means of a stacked arrangement 18 of metallic mirror layer structure 20—organic intermediate layer structure 24—metallic mirror layer structure 22 is explained, which has a comparable transmittance $T(\lambda)$, but an improved linewidth at 0° compared to a stack arrangement 18 of a conventional dielectric filter, but above all has a drastically improved angular stability with respect to angular dispersion. The novel interference filter 10 exhibits a blue shift of less than 5 nm at a tilt form 0° to 89°, while the conventional design exhibits a shift of 50 nm to 100 nm (depending on the polarization of the incident light).

In order to demonstrate that the concept of the novel filter 10, 28 is universal, two filters 10, 28 are presented below, each operating at different wavelengths, wherein different organic materials are used in the intermediate layer structure 24. Finally, possible variations and upgrades of the interference filter 10 in combination with other filter types are presented.

Figure 2:
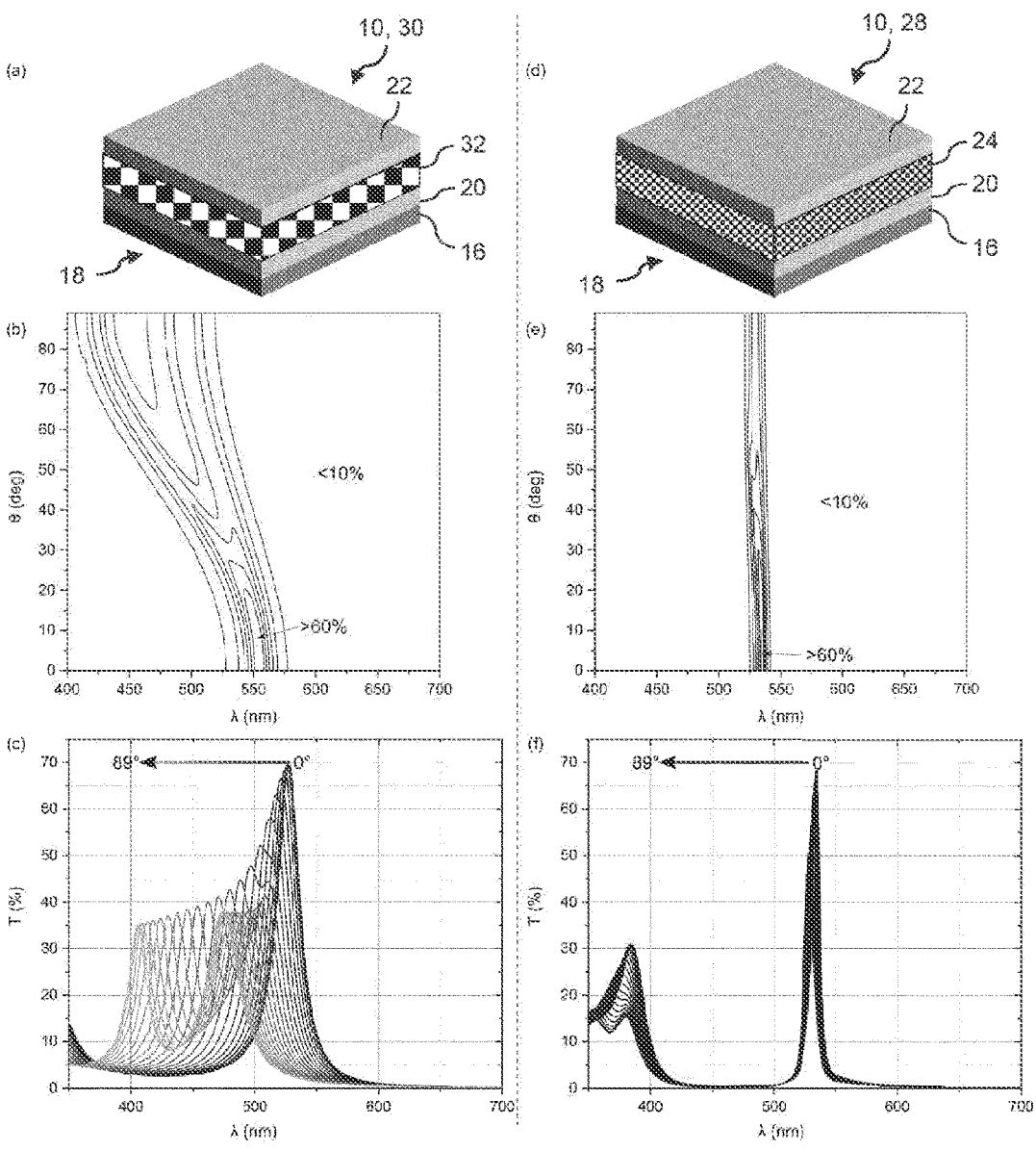
FIG. 2 shows a comparison of two interference filters, one acting as a dielectric filter and the other as an interference filter according to a preferred embodiment of the invention.

FIG. 2 shows a comparison of two interference filters 10, one of which is formed as a dielectric filter 30 (left) and the other as a polariton filter 28 (right). In addition to the respective construction of the two interference filters 10 (top), the angular dispersion of the two interference filters 10 is further shown in a respective graph (middle), in which the angle $\theta$ is plotted against the wavelength $\lambda$ of the transmitted (filtered) wavelength, as well as a respective graph (bottom), in which the transmittance is plotted as a function of the angle $\theta$ against the wavelength $\lambda$.

First, the dielectric filter 30 (FIG. 2 left—(a)-(c)) will be discussed: The most conventional narrowband filters are based on dielectric interference, since this is the most efficient and flexible design. As explained in the introduction of the description, this design inherently shows a strong angular dependence, see equation (2). This is a fundamental physical principle and cannot be overcome by changing the resonator or cavity design. In practice, this limits the overall operation of such filters 30 to normal or fixed angle incident and collimated light beams. Applications with multiple angles of incidence, scattering experiments, gas spectroscopy, etc., are all limited by the angle-dependent blue shift, which can easily reach 10% or more of the central wavelength.

FIG. 2, top left, shows a particularly simple design of a conventional dielectric filter 30 comprising a metal-dielectric-metal (M-D-M) stack arrangement 18, in which two thin metal films (35 nm each) surround a transparent dielectric layer (here, $SiO_2$, 140 nm). While more complex filter designs are also widely used, e.g., the replacement of metallic by dielectric mirror layer structures, the functional principle remains the same. The mirror layer structures 20, 22 surrounding the dielectric intermediate layer structure 24 form an optical resonator 26 or cavity, which in turn leads to constructive interference at the desired wavelength corresponding to the thickness d of the dielectric intermediate layer structure, see equation (1) from the introduction to the description. This leads to a narrow band line of transmitted light at this wavelength, wherein the transmission is substantially improved compared to the bare mirror layer structures 20, 22. The resonance condition changes when the filter 10 is tilted, and the momentum vector $\vec{k}$ picks up an additional component in the plane:

$$\vec{k} = \vec{k}_\perp + \vec{k}_\parallel$$

which in turn leads to an angular dispersion $$\lambda(k) = 2\pi / \sqrt{\vec{k}_\perp^2 + \vec{k}_\parallel^2}$$

How $\vec{k}_\parallel$ depends on the angle of incidence, the scattering can also be described as $\lambda(\theta)$ as in equation (2) above.

FIG. 2 shows on the left center, i.e., in plot (b), the angular displacement during tilting using a transfer matrix simulation of the filter transmission. Here, not only a significant blue shift in the wavelength at which light is transmitted can be observed, but in addition the line splits into two polarization states. This effect is explained by the Fresnel equations for reflection and transmission, which depend on the polarization at nonzero angles of incidence. Such a basic filter device again in turn exhibits a wavelength shift of $\approx 50$ nm for p-polarized light and >100 nm for s-polarized light. The effect can be seen even more clearly when the transmission spectrum for different angles of incidence is considered, as shown in FIG. 2, bottom left, i.e., plot (c).

So far, the only way to circumvent large wavelength shifts is to use dielectric intermediate layer structures 24 with high refractive index, since the observed blue shift for materials with high refractive index (n) is reduced, see equation (2). Nevertheless, even with a refractive index of 3, the corresponding shift at 30° is still 2% of the central wavelength (about 11 nm for the filter 10 shown). In addition, such high refractive index materials, e.g., III-V semiconductors, are more difficult to process, resulting in higher manufacturing costs, and many exhibit a strong optical absorption over substantial por-tions of the optical spectrum.

Other known filter structures with reduced angular dependence are based on plas-monic nanostructures, but so far exhibit limited and reduced performance and high losses. Alternatives include combinations of absorption filters, although a true narrowband operation with low absorption losses cannot be achieved in most cases. In addition, absorption filters are often larger and bulkier when high blocking rates (i.e., strong absorption outside the transmission line) are required.

In the case of the interference filter 10, which is designed as a polariton filter 28, the M-D-M design of the dielectric filter 30 is modified by replacing the dielectric with a "strong coupling" layer structure, see FIG. 2 right (plots (d)-(f)). In turn a narrowband transmission is achieved by an optical resonance, here a hybridized exciton-polariton (or simply polariton) mode. The resulting polariton filter 28 with two 35 nm metal mirrors as mirror layer structures 20, 22 achieves a similar high transmission as the conventional M-D stack arrangement 18. However, the dependence of the transmitted wavelength on the angle of incidence is drastically reduced to such an extent that even an inclination of 89° (an angle that is unrealistic in practice) results in a spectral shift of the main resonance by only 5 nm. The interference filter 10, designed as a polariton filter 28, offers the additional advantage that the transmission line is narrower-banded than in the case of the interference filter 10, which is designed as a dielectric filter 28. This behavior is based on a coherent interaction of light and matter resonances.

Figure 3:
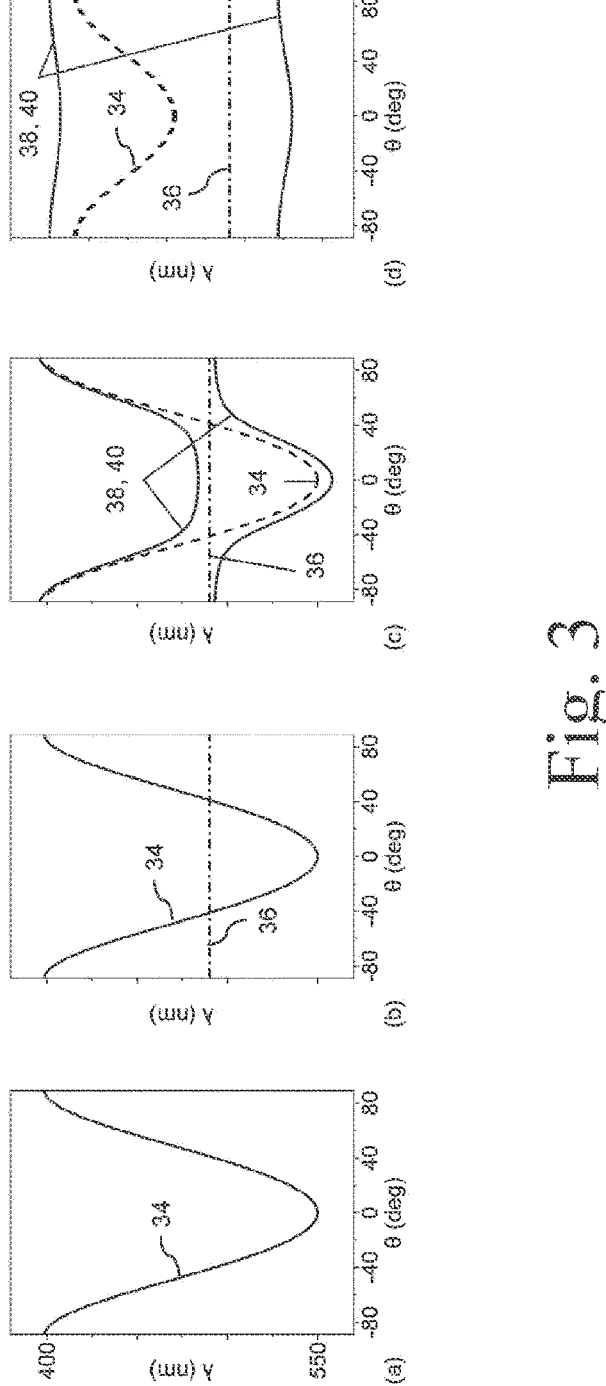
FIG. 3 shows a series of resulting band structures with a bare resonator and interference filters formed as polariton filters with differently formed modes.

FIG. 3 gives an overview of the shape of transmission modes in a transition from a bare resonator 26 or cavity to the desired structure of the polariton filter 28 and helps to explain the principle of operation. It shows a series of band structures corresponding to the modes in a respective plot (a)-(d), where the wavelength k is plotted versus angle θ and which illustrates the corresponding angular dispersion. A bare resonator 18 or cavity, e.g. a dielectric filter 30 of the M-D-M type, is described by its optical resonance, which results from the equations (1) and (2) mentioned at the beginning and is shown in plot (a). If one now replaces the non-interacting dielectric intermediate layer structure 32 of a dielectric filter 30 by an optically active intermediate layer structure 24, which exhibits a material resonance (here: exciton) in the desired spectral range, either weak coupling (plot (b)) or a strong coupling (plots (c) and (d)) of light and matter of the intermediate layer structure 24 can be achieved. In the weak coupling region, the cavity mode 34 acts as an optical background system that influences the transmission or emission of the filter 10, but without affecting the cavity mode 34 or the exciton mode 36, and no energetic exchange between the two modes 34, 36 takes place. This principle underlies, for example, in conventional laser resonators and resonator amplified devices. In the case of the strong coupling (SC) shown in plot (c), instead a coherent interaction between the cavity photon and material exciton is obtained, wherein the one is converted into the other. This process requires an interaction strength stronger than the loss mechanisms for both the cavity or resonator photon (emission, parasitic absorption, scattering) and the exciton (non-radiative re-combination). In turn, the interaction between the two becomes the dominant process within the cavity/resonator 26 and their energetic degeneration is cancelled. Similar to coupled resonators or molecular orbitals, the photon and exciton resonances hybridize and exhibit an energetic split into a binding (lower polariton, lower energies) polariton mode corresponding to a first transmission mode 38, and an anti-binding (upper polariton, higher energies) polariton mode corresponding to a second transmission mode 40. This energetic splitting $\Delta E$ (Rabi splitting) changes the dispersion of a SC-based device, in particular polariton filter 28, strongly and changes from a more photonic (dispersive, small angles) to a more excitonic (non-dispersive, large angles) behavior for the lower polariton (vice versa for the upper polariton). This behavior can be described by a coupled oscillator model that combines photon and exciton resonances which is the basis for the calculations behind the plots of FIGS. 3 (*c*) and (*d*).

The process of strong light-matter coupling now enables the possibility of tuning the device dispersion by polariton modes and allows a further degree of freedom in con-trolling the coupling strength. By strongly increasing the interaction, e.g., by increasing the number of interacting molecules or improving the optical quality of the resonator 26, the dispersion can be distorted more strongly, bringing the system into the ultra-strong coupling regime, defined by a coupling strength of at least 10% compared to the energy of bare resonance. Plot (d) of FIG. 3 shows a system in this ultra-strong coupling regime and additionally with a positive optical detuning of the cavity mode 34 (i.e. shift to higher energies). Compared to the other scenarios shown in FIG. 3, this system shows a very flat dispersion of both the lower polariton mode (first transmission mode 38) as well as of the upper polariton mode (second transmission mode 40). As shown above, this is not accompanied by a loss of the optical quality of the system. On the contrary, polariton modes normally show narrower peaks than their underlying optical resonances. The reduced angular dependence is additionally supported by a high effective refractive index, which is associated with strong resonances due to Kra-mers-Kronig consistency.

It is important to note that this behavior is fundamentally different from a simple combination of a conventional narrowband dielectric and a broadband absorbing filter. This is because only the coherent interaction between photons and excitons leads to a re-organization of modes 34, 36. While a well-selected absorbing filter can suppress the spectrally shifted transmission of conventional filters at high angles to a certain degree, this light is then lost and is not available for further use. With the design of the polariton filter 28, we instead achieve an actual change in light scattering and thus a high light yield, which in turn offers new possibilities for use and flexible application.

The formation of polaritons by strong light-matter coupling is a well-known phenome-non and is exploited in academic research in light-emitting devices such as polariton lasers and light-emitting diodes, in light-receiving devices such as photodiodes, and in electronic devices such as transistors. In all these cases, the transmission of light through a strongly coupled device has not been studied in detail, and transmission or reflection maps are used only to demonstrate the strong coupling. One application of the dispersion of polaritons to realize optical filters with improved angular stability has not yet been proposed or demonstrated. Instead, current research focuses on the effect of light on the properties of the material within the cavity/ resonator 26, and it has been found that a strong coupling can lead to changes in the absorption behavior, can enhance charge transport or affect chemical behavior.

Figure 4:
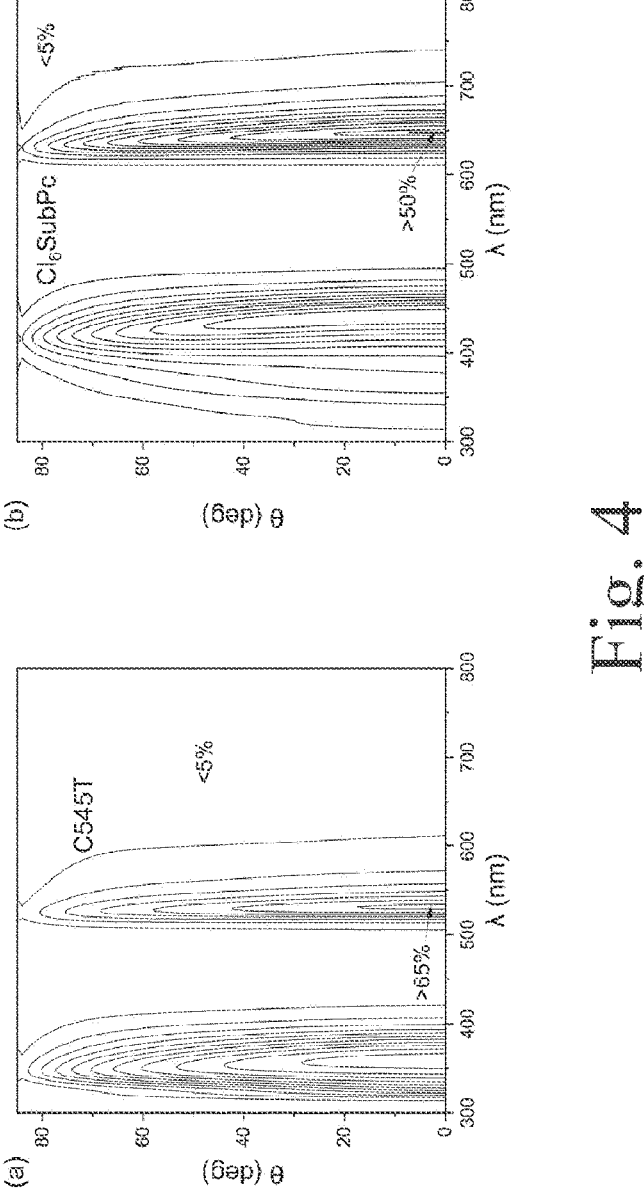
FIG. 4 shows measured angle-resolved transmission plots of the interference filters according to a preferred embodiment of the invention.

FIG. 4 shows measured angular- and wavelength-resolved transmission plots of interference filters 10 formed as polariton filter 28 and consisting of two 25 nm Ag mirror layer structures 20, 22 and an SC intermediate layer 24 of 80 nm coumarin 545 T (a) or 80 nm $Cl_6SubPc$ (b). The transmittance is shown in percent (%), wherein "contour lines" indicate the progression between the extreme values indicated directly. A strong coupling was demonstrated for both materials. The measured behavior agrees well with the predicted performance and the transmittance spectrum shows a very small change with angle θ. It is expected that further improvements in design and fabrication conditions will increase the transmittance beyond that already demonstrated extent.

Since the underlying principle of operation is not limited to any particular material, class of material or spectral range, it can be applied in a broad way. The flexible chemical design of organic materials makes it possible to realize filters 28 that operate at virtually any wavelength in the near-UV to near-IR region of the spectrum, wherein inorganic materials open up possibilities for other regions of the electromagnetic spectrum.

Until now, the angular dispersion of interference filters 10 has been a fundamental property of these filters and therefore has always been a limitation in the design of optical devices, wherein engineers generally not even consider the question of what might be done if filters exhibited an angle-independent transmission. A truly narrowband and angle-independent filter design will enable a variety of new applications and offer significant improvements and simplifications to existing applications. As described above, previous designs are not capable of achieving the demonstrated operation at high angles, even if expensive high index materials are used. The angle-independent transmission is important in applications that rely on multiple or unknown angles of incidence, such as scattering or gas spectroscopy, fluorescence spectroscopy, high numerical aperture focusing. Furthermore, they allow a more flexible design of optical setups and devices. Shaped and curved optical elements such as lenses and mirrors could be directly coated with the polariton filter to enable a wide range of spectroscopic devices.

It is anticipated that such a concept will be particularly important for miniaturized optical elements in which light often cannot be properly collimated. Because the polariton filters 28 have a thickness in the order of a few hundred nanometers, they can be easily implemented in miniaturized designs and can be combined with other components, such as micro lenses, without compromising performance. In this way, lensless cam-eras for fluorescence imaging can be realized. An array of polariton filters 28 can enable lab-on-chip miniature spectroscopy in which scattering and fluorescence may be predominant.

In addition, the applicant has recently demonstrated optical devices at ultra-flexible membranes. Transferring the invention of polariton filter 28 to such membranes would result in "filter films" with a thickness comparable to cling films used in (food packaging). Since the polariton filter has a negligible angular dependence, such a film could be integrated directly onto or into a variety of optical systems of any geometry without the need to maintain a flat surface. For example, films could be directly and reversibly applied to lenses and objectives.

Figure 5:
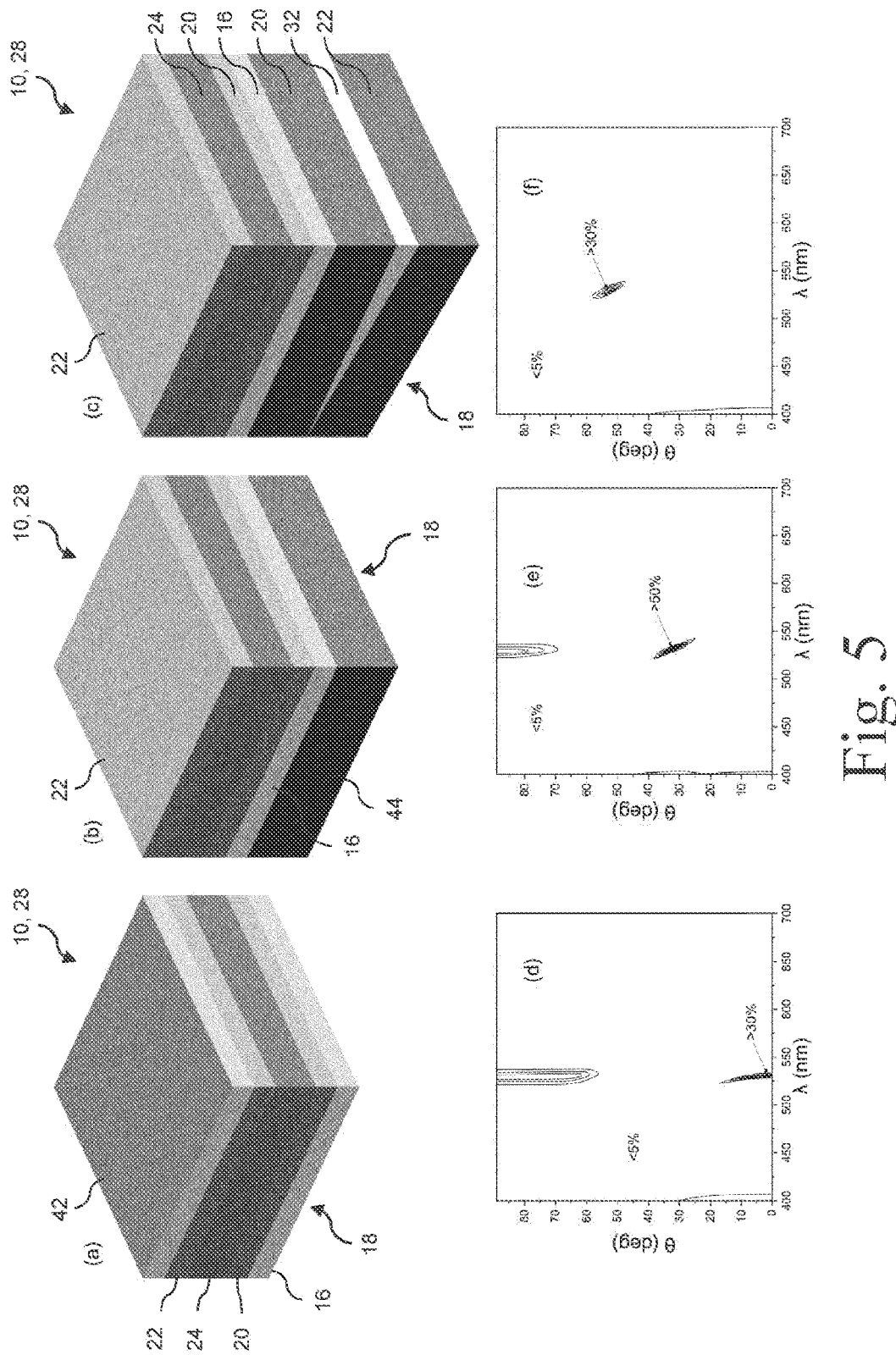
FIG. 5 shows several variants of the proposed interference filter, in particular combinations of polariton and conventional filters.

FIG. 5 shows several variations of the proposed design, in particular combinations of polariton filters 28 and conventional filters. As explained in detail above, the operating principle of polariton filters 28 is not restricted to a particular mirror design or material.

Some organic materials are sensitive to oxygen and moisture, especially when ex-posed to optical radiation at the same time. Therefore, when using organic materials, an additional protective or encapsulating layer may be useful, as shown in plot (a) of FIG. 5, in order to shield the organic layers. This results in the following stack arrangement 18 of layer structures: substrate 16, mirror layer structure 20, intermediate layer structure 24, mirror layer structure 22, and top layer structure 42. While this has proven to be extremely important and challenging in active devices (e.g., solar cells and light-emitting diodes), the oxygen and moisture sensitivity is less of an issue in an electrically passive design such as the filter 10 proposed here, so that the requirements for pro-tection are significantly loosened. The nature of the polariton formation means that, in any case, two polariton modes and correspondingly two transmission modes 38, 40 are generated. Even if the two modes are energetically separated from each other, this may still be undesirable and can be remedied by the use of an additional (conventional) filter, as shown in plot (b) of FIG. 5. Here, the following stack arrangement 18 of layer structures results: mirror layer structure 22, intermediate layer structure 24, mirror layer structure 20, substrate 16, further mirror layer structure 40.

The combination of the strong dispersion of conventional dielectric filters 30 with the nearly complete absence of dispersion in the polariton filter 28 enables further, more complex applications, as shown in plot (c) of FIG. 5. Here, the following stack arrangement 18 of layer structures is obtained: mirror layer structure 22, intermediate layer structure 24, mirror layer structure 20, substrate 16, mirror layer structure 20, intermediate layer structure 32, and mirror layer structure 22.

In particular, it is possible to construct combinations of conventional filters and polariton filters 28 that have a highly angle-selective transmission and transmit light only at the angle of incidence where the dispersion of the conventional and the polariton filter overlap, as shown in plots (d) to (f) of FIG. 5. The wavelength and angle at which this occurs can be freely tuned by adjusting the design and choice of material. The angle-selective transmission of a filter has been demonstrated previously by combining different conventional filters, albeit with lower performance.

LIST OF REFERENCE SYMBOLS

- 10 interference filter
- 12 arrow (incident light)
- 14 arrow (transmitted, energy-selectively filtered light)
- 16 substrate
- 18 stack arrangement
- 20 mirror layer structure (partially permeable)
- 22 mirror layer structure (partially permeable)
- 24 intermediate layer structure (with material resonance)
- 26 resonator
- 28 polariton filter
- 30 dielectric filter

32 intermediate layer structure (without material resonance)

34 cavity mode (or resonator mode)

36 exciton mode

38 first polariton mode (binding)

40 second polariton mode (anti-binding)

42 cover layer structure

44 further mirror layer structure d distance $\Delta E$ size of Rabi splitting $E_M$ energy of the coupling material resonance $E_G$ fixed limit of the energy $\lambda_A$ absorption wavelength $\lambda_R$ resonator wavelength $T(\lambda)$ transmittance

The invention claimed is:

1. An interference filter for wavelength-selective filtering of light, comprising a stack arrangement of layer structures, which include two partially permeable mirror layer structures and an intermediate layer structure arranged between the two partially permeable mirror layer structures, wherein the two partially permeable mirror layer structures and the intermediate layer structure form an optical resonator having a characteristic resonator wavelength $\lambda_R$, wherein the intermediate layer structure has such an excitonic material resonance at an absorption wavelength $\lambda_A$ that under illumination of the interference filter with light the wavelength-dependent transmittance $T(\lambda)$ of the stack arrangement in a wavelength range surrounding the absorption wavelength $\lambda_A$ is determined by a strong coupling of the photons of the light located in the resonator with excitons of this material resonance, wherein a distance of the mirror layer structures to each other and a refractive index of the intermediate layer structure are such that the resulting resonator wavelength $\lambda_R$ in relation to the absorption wavelength $\lambda_A$ is such a way that under illumination of the interference filter with light two energetically spaced transmission modes form, wherein at least one of the transmission modes exhibits a course dependent on the angle of incidence of the light, in such a way that when the angle $\theta$ of incidence changes away from perpendicular incidence $\theta=0°$, a change in the transmission wavelength $\lambda_T$ towards lower wavelengths occurs, wherein the change in the transmission wavelength $\lambda_T$ relative to the value at perpendicular incidence $\theta=0°$ is less than 2% at an angle of incidence of $\theta=45°$ and less than 5% at an angle of incidence of $\theta=80°$, wherein the interference filter has a transmittance $T(\lambda)$ of at least 0.05 for at least one of the transmission wavelengths $\lambda_T$ of the transmission modes at perpendicular incidence, and wherein the intermediate layer structure has an absorption at the absorption wavelength $\lambda_A$ and at perpendicular incidence of at least 10%.

2. The interference filter according to claim 1, wherein the resonator wavelength $\lambda_R$ at perpendicular incidence of light is at most as large as the absorption wavelength $\lambda_A$, i.e. that $\lambda_R \leq \lambda_A$ applies.

3. The interference filter according to claim 1, wherein under illumination of light due to the strong coupling of the photons of the light located in the resonator with the material resonance, an energetic splitting, called Rabi splitting, of the transmission modes is achieved, wherein a magnitude $\Delta E$ of the energetic splitting exceeds the smaller of the two values mentioned below:

5% of a total energy $E_M$ of the excitonic coupling material resonance; or a fixed limit $E_G$ with $E_G=100$ meV.

4. The interference filter according to claim 1, wherein at least one of the transmission modes has a quality factor Q of $Q=>8$.

5. The interference filter according to claim 1, wherein each of the two partially permeable mirror layer structures has a reflectivity of at least 20% at a relevant wavelength range $\Delta\lambda_{rel}$ encompassing the resonator wavelength $\lambda_R$, the absorption wavelength $\lambda_A$ and a transmission wavelength $\lambda_T$ of the filter.

6. The interference filter according to claim 1, wherein the material of the intermediate layer structure is an organic material.

7. The interference filter according to claim 1, wherein the interference filter is an interference filter for filtering light from at least one of the following spectral ranges:

UV range;

VIS range;

NIR range;

IR range; and

THz range.

8. A stack arrangement of layer structures configured as an interference filter, wherein the stack arrangement of layer structures comprises two partially permeable mirror layer structures and an intermediate layer structure arranged between the two partially permeable mirror layer structures, wherein the two partially permeable mirror layer structures and the intermediate layer structure form an optical resonator having a characteristic resonator wavelength $\lambda_R$, wherein under illumination of the interference filter with light the intermediate layer structure has such an excitonic material resonance at an absorption wavelength $\lambda_A$ that the wavelength-dependent transmittance $T(\lambda)$ of the stack arrangement in a wavelength range surrounding the absorption wavelength $\lambda_A$ is determined by a strong coupling of the photons of the light located in the resonator with excitons of this material resonance, wherein a distance of the mirror layer structures to each other and a refractive index of the intermediate layer structure are such that the resulting resonator wavelength $\lambda_R$ in relation to the absorption wavelength $\lambda_A$ is such a way that under illumination of the interference filter with light two energetically spaced transmission modes form, wherein at least one of the transmission modes exhibits a course dependent on the angle of incidence of the light, in such a way that when the angle $\theta$ of incidence changes away from perpendicular incidence $\theta=0°$, a change in the transmission wavelength $\lambda_T$ towards lower wavelengths occurs, wherein the change in the transmission wavelength $\lambda_T$ relative to the value at perpendicular incidence $\theta=0°$ is less than 2% at an angle of incidence of $\theta=45°$ and less than 5% at an angle of incidence of $\theta=80°$, wherein the interference filter has a transmittance $T(\lambda)$ of at least 0.05 for at least one of the transmission wavelengths $\lambda_T$ of the transmission modes at perpendicular incidence, and wherein the intermediate layer structure has an absorption at the absorption wavelength 2A and at perpendicular incidence of at least 10%.

* * * * *